US012786320B2

(12) United States Patent
Mizumura et al.

(10) Patent No.: US 12,786,320 B2
(45) Date of Patent: Nov. 3, 2026

(54) IMAGE PROCESSING SYSTEM, NON-TRANSITORY COMPUTER READABLE MEDIUM, AND IMAGE PROCESSING METHOD

(71) Applicant: FUJIFILM Business Innovation Corp., Tokyo (JP)

(72) Inventors: Masahiko Mizumura, Kanagawa (JP); Yushiro Tanaka, Kanagawa (JP); Saki Shidara, Kanagawa (JP); Seiji Shiraki, Kanagawa (JP); Nagamasa Misu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 73 days.

(21) Appl. No.: 18/583,899

(22) Filed: Feb. 22, 2024

(65) Prior Publication Data

US 2025/0088595 A1 Mar. 13, 2025

(30) Foreign Application Priority Data

Sep. 7, 2023 (JP) ................................ 2023-145374

(51) Int. Cl.
*H04N 1/00* (2006.01)

(52) U.S. Cl.
CPC ..... *H04N 1/00005* (2013.01); *H04N 1/00037* (2013.01); *H04N 1/00068* (2013.01); *H04N 1/00092* (2013.01)

(58) Field of Classification Search
None
See application file for complete search history.

(56) References Cited

U.S. PATENT DOCUMENTS

2016/0044190 A1* 2/2016 Miyaji ................. H04N 1/3255 358/1.15
2019/0364166 A1* 11/2019 Inami ................. H04N 1/00867

FOREIGN PATENT DOCUMENTS

JP 2020150372 9/2020

* cited by examiner

*Primary Examiner* — Andrew H Lam
(74) *Attorney, Agent, or Firm* — JCIPRNET

(57) ABSTRACT

An image processing system includes: a processor configured to: determine, for each of predetermined areas, whether a black spot corresponding to a pixel with density greater than or equal to specified density is included in image data generated by reading a received document sheet; make a count of the black spot for each predetermined area; recognize, as a specific area, an area that is one of the predetermined areas and that includes a black spot a count of which is greater than or equal to a first threshold; recognize, as a different area relevant to the specific area, an area that is located at a position a predetermined length away from the specific area and that is located parallel or perpendicular to a scanning direction of the image data, the area including a black spot a count of which is greater than or equal to the first threshold; calculate a sum total of the count of the black spot for the document sheet and determine whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detect, as image data regarding a blank document sheet, image data regarding a document sheet with the derived count less than or equal to the specified value.

8 Claims, 8 Drawing Sheets

IMAGE PROCESSING SYSTEM, NON-TRANSITORY COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2023-145374 filed Sep. 7, 2023.

BACKGROUND

(i) Technical Field

The present disclosure relates to an image processing system, a non-transitory computer readable medium, and an image processing method.

(ii) Related Art

For image processing systems, there is technology for detecting a piece of image data regarding a blank document sheet from among one or more pieces of image data corresponding to one or more read document sheets (hereinafter, referred to as a blank-sheet detection function).

If a blank document sheet has holes (for example, holes for binding sheets of a document sheet), the blank-sheet detection function desirably causes a system to recognize the holes as not text or figures and discriminate image data generated from a blank document sheet from image data generated from a document sheet other than a blank document sheet. However, if each hole is, for example, circular, the hole is recognized as a circular and black image in the image processing system. For this reason, another function is separately required to discriminate between an image representing a hole and an image representing a circular and black figure formed on the document sheet.

Japanese Unexamined Patent Application Publication No. 2020-150372 discloses an information processing apparatus capable of causing even a document sheet having punch holes to be detected as a blank sheet. In the information processing apparatus, a document size is read in advance, an image portion corresponding to an area where a punch hole is possibly present is extracted from image data on the basis of the document size. If there are pixels with predetermined density in the area, the pixels are recognized as a punch hole.

SUMMARY

Some image processing systems do not have the function of detecting a document size. To such systems, such technology that determines whether a document sheet has holes on the basis of the document size is not applicable.

Aspects of non-limiting embodiments of the present disclosure relate to determining, as an image of a hole in the document sheet, an image corresponding to image data on which the count or the position of black spots satisfies a specific condition and detecting the image data as image data regarding a blank document sheet in the absence of an image such as text, a symbol, or a figure except an image of a hole, the determining being performed regardless of the presence or the absence of a function of detecting a document size or a function of detecting the presence or the absence of a hole on the basis of a document size.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image processing system including: a processor configured to: determine, for each of predetermined areas, whether a black spot corresponding to a pixel with density greater than or equal to specified density is included in image data generated by reading a received document sheet; make a count of the black spot for each predetermined area; recognize, as a specific area, an area that is one of the predetermined areas and that includes a black spot a count of which is greater than or equal to a first threshold; recognize, as a different area relevant to the specific area, an area that is located at a position a predetermined length away from the specific area and that is located parallel or perpendicular to a scanning direction of the image data, the area including a black spot a count of which is greater than or equal to the first threshold; calculate a sum total of the count of the black spot for the document sheet and determine whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detect, as image data regarding a blank document sheet, image data regarding a document sheet with the derived count less than or equal to the specified value.

BRIEF DESCRIPTION OF THE DRAWINGS

An exemplary embodiment of the present disclosure will be described in detail based on the following figures, wherein.

DETAILED DESCRIPTION

Figure 1:
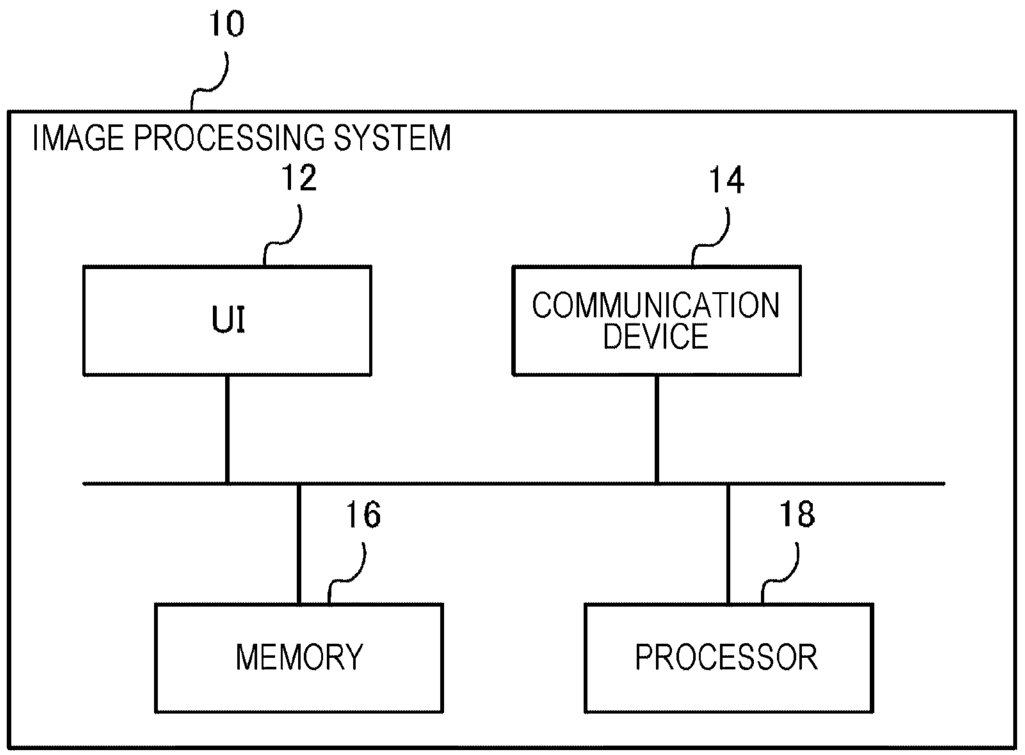
FIG. 1 is a block diagram illustrating the hardware configuration of an image processing system.

FIG. 1 is a block diagram illustrating the hardware configuration of an image processing system. An image processing system 10 illustrated in FIG. 1 is a system using the following technology (that is, the blank-sheet detection function). Image data generated by reading a document sheet is processed, and image data generated from a blank document sheet is discriminated from image data generated from a document sheet other than a blank document sheet. Specifically, suppose a case where read document sheets have holes for binding the document sheets (for example, two holes opened with a two-hole punch). Even in this case, the image processing system 10 does not perform recognition uniformly. The image processing system 10 does not perform recognition that a circular and black figure or the like is present. Instead, the image processing system 10 determines whether the document sheet is a blank sheet, depending on whether an image portion representing the holes satisfies a predetermined condition. In the determination process described above, the image processing system 10 is capable of discriminating between image data generated from a blank document sheet and image data generated from a document sheet other than a blank document sheet and further performing different image processing by using the result of the discrimination. In the exemplary embodiment, an example where the image processing system 10 executes a blank-sheet detection process and thereafter executes a process for excluding image data regarding a document sheet determined as a blank sheet from output data will be described. The process after the blank-sheet detection process is not necessarily required. The image processing system 10 may perform processing steps up to the blank-sheet detection process and transmit the result as information to a different system or the like, and the different system may perform subsequent processing. The term "output" herein denotes a process for storing data in the memory or the like in the image processing system 10, a process for transmitting data to the outside of the image processing system 10, a process for printing read image on the sheet, and other processes and is not particularly limited.

The image processing system 10 includes an apparatus such as a personal computer (hereinafter, referred to as a PC), an image processing apparatus, or a server. The image processing apparatus is an apparatus having at least one of a scanning function, a printing function, and a copying function. The image processing apparatus may also be a multi-function printer having the scanning function, the printing function, the copying function, and the like.

As illustrated in FIG. 1, the image processing system 10 includes a user interface (UI) 12, a communication device 14, a memory 16, and a processor 18.

The UI 12 includes a display and an input device. The display is a liquid crystal display, an electroluminescence (EL) display, or the like. The input device is a keyboard, a mouse, an input key, an operation panel, or the like. The UI 12 may be a UI such as a touch panel serving as the display and the input device.

The communication device 14 includes one or more communication interfaces having a communication chip, a communication circuit, or the like and has a function of transmitting information to a different apparatus and a function of receiving information from the different apparatus. The communication device 14 may have a wireless communication function such as short-range wireless communication or Wi-Fi (registered trademark) and may also have a wired communication function.

The memory 16 is a device that forms one or more memory areas storing data. The memory 16 is formed from, for example, a hard disk drive (HDD), a solid state drive (SSD), various memories (such as a random access memory (RAM), a dynamic RAM (DRAM), a non volatile RAM (NVRAM), and a read only memory (ROM)), other storages (such as an optical disk), or combination of these.

The processor 18 controls the operations of the components of the image processing system 10.

The processor 18 determines whether there is a black spot corresponding to a pixel with specified density on the image data regarding a read document sheet. From the sum total of the count of black spots on the document sheet and the count of black spots in images representing portions corresponding to two holes opened in the document sheet with the two-hole punch (hereinafter, referred to as punch holes), the processor 18 determines whether the document sheet is a blank sheet. The phrases "a document sheet is a blank sheet" and "a blank document sheet" denote a document sheet where an image such as text, a symbol, or a figure is not formed. Note that pixels composed of an extremely small number of black spots such as dirt, dirt, a tiny smear, or the adhering to the document sheet are desirably excluded from an element, such as a figure, of the image. Hence, the processor 18 determines whether the count of black spots on one piece of image data is less than or equal to a specified value. For example, if there is only a tiny smear on the blank document sheet, the count of the black spots is naturally less than or equal to the specified value, and thus the tiny smear is not recognized as an image. The document sheet may be determined as a blank document sheet. The two-hole punch is herein taken as an example of the punch for opening holes; however, the example is not limited to this. For example, the punch holes may be three holes or four holes respectively opened with a three-hole punch or a four-hole punch. Further, in the description for the exemplary embodiment, the shape of the punch holes is a circle but is not limited to this. It is not intended to exclude a hole of a shape other than the circle.

Figure 2:
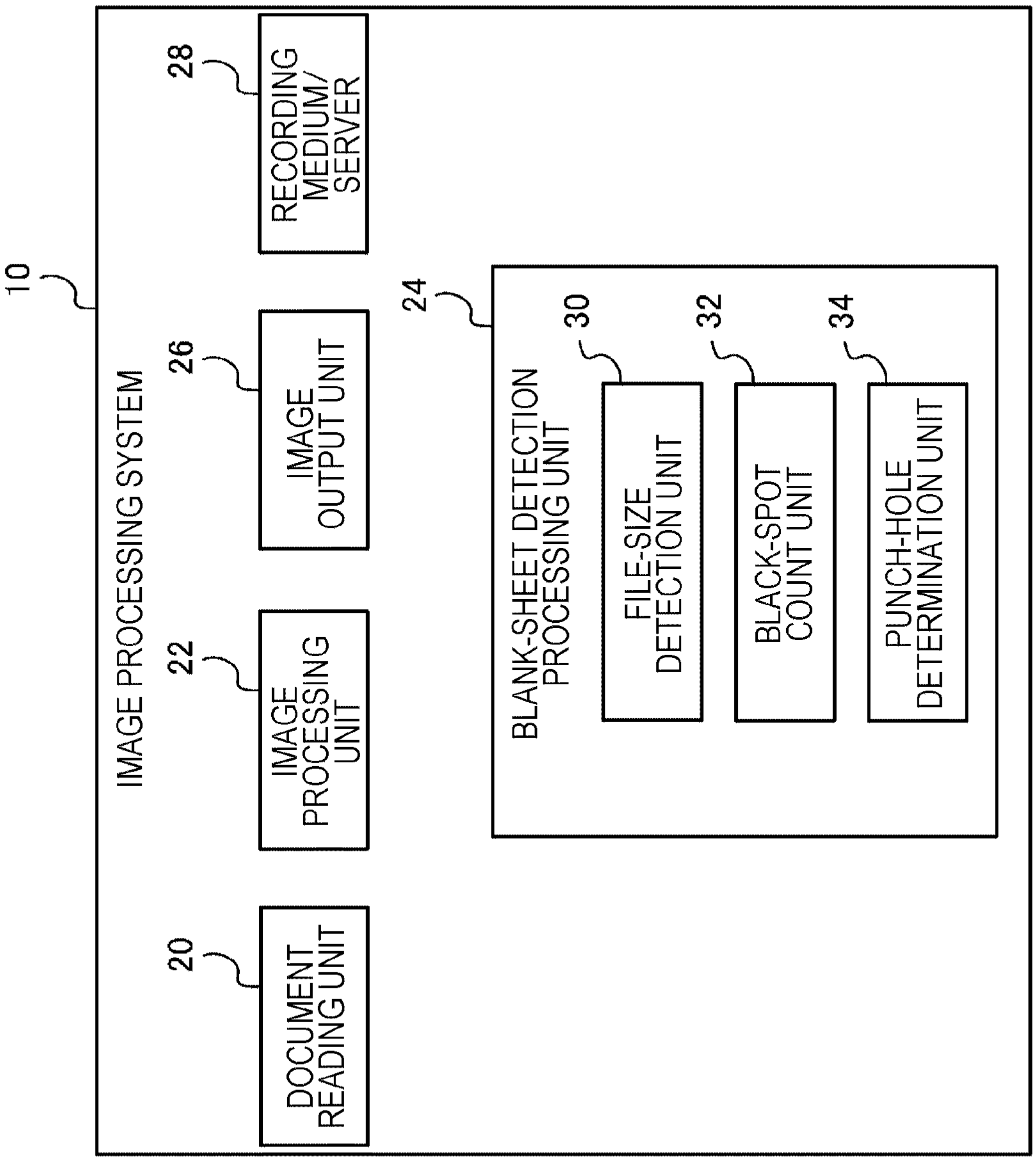
FIG. 2 is a block diagram illustrating functions of the image processing system.

The image processing system 10 will further be described with reference to FIG. 2. FIG. 2 is a block diagram illustrating the functions of the image processing system 10.

The image processing system 10 includes a document reading unit 20, an image processing unit 22, a blank-sheet detection processing unit 24, an image output unit 26, and a recording medium/server 28. The respective functions of the document reading unit 20, the image processing unit 22, the blank-sheet detection processing unit 24, the image output unit 26, and the recording medium/server 28 are implemented by the processor 18.

The document reading unit 20 detects and reads one or more document sheets and generates image data from each read document sheet. For example, the document reading unit 20 detects and reads a document sheet placed on the document bed of the multi-function printer or transported from the document tray. For example, the document reading unit 20 may also receive image data from an external information processing apparatus or the like.

The image processing unit 22 performs image processing of the image data generated by the document reading unit 20 or the received image data. As an example of the image processing, a process for dividing an area formed on image data generated from an image corresponding to one page of a document into multiple areas (for example, areas indicated by grid-like blocks) or the like is cited.

The blank-sheet detection processing unit 24 is in charge of major processes in the blank-sheet detection. Specifically, the blank-sheet detection processing unit 24 includes a file-size detection unit 30, a black-spot count unit 32, and a punch-hole determination unit 34. With processes executed by the file-size detection unit 30, the black-spot count unit 32, and the punch-hole determination unit 34, the blank-sheet detection processing unit 24 implements the blank-sheet detection process for causing the system to recognize even a document sheet having a punch hole as a blank sheet.

The file-size detection unit 30, the black-spot count unit 32, and the punch-hole determination unit 34 will then further be described. The file-size detection unit 30 detects the file size (in other words, data volume) of the image data generated by the document reading unit 20 or the received image data.

The reason why the image processing system 10 is provided with the file-size detection unit 30 is that one or more subsequent steps in the blank-sheet detection process are allowed to be skipped to advance the process, depending on the detection result. Image data generated by reading a document sheet without text or a figure typically has a small file size. That is, it is possible to determine image data having a file size less than a predetermined value as image data generated from a blank document sheet, and thus subsequent steps in the blank-sheet detection process is not required. Hence, in such a case, the processor 18 terminates the blank-sheet detection process. As described above, the detection of the file size of the image data by the file-size detection unit 30 enables the read document sheet to be roughly categorized on the basis of whether the document sheet is a blank sheet. As the result, for the document sheet categorized as a blank sheet at this stage, subsequent part of the blank-sheet detection process may be omitted.

The black-spot count unit 32 counts the count of the black spots on the image data. More specifically, the black-spot count unit 32 counts the black spots in each area (for example, each area indicated by a corresponding one of the grid-like blocks illustrated in FIG. 4 to be described later) divided in the process by the image processing unit 22. Further, the black-spot count unit 32 counts black spots on one entire document sheet (that is, total black spots on one piece of image data generated from an image corresponding to a page of a document).

The reason why the black-spot count unit 32 counts the black spots on the entire document sheet is that one or more subsequent steps in the blank-sheet detection process are allowed to be skipped to advance the process, depending on the result of the counting above. For each piece of image data generated from the one document sheet, the black-spot count unit 32 adds, to another, the count of black spots in the block subjected to the counting. If the addition result of the count of the black spots reaches a set value or greater even before the blank-sheet detection process is not completed for one piece of image data, the processor 18 terminates the blank-sheet detection process. That is, if the count of black spots on one piece of image data reaches the set value or greater, the document sheet serving as the source of the image data may be clearly determined not to be a blank document sheet from the count of the black spots, regardless of whether a punch hole is opened. The blank-sheet detection process is thus terminated, and subsequent part of the blank-sheet detection process to be executed on the document sheet that is not clearly a blank sheet is omitted. The set value described above is set on the assumption of the count of the black spots on the document sheet that is not clearly a blank sheet and is thus a value greater than the specified value set as a threshold for determining a blank document sheet.

On the basis of the count of the black spots counted by the black-spot count unit 32, the punch-hole determination unit 34 determines whether black spots in a specific area and any of areas neighboring the specific area are black spots serving as an image representing a punch hole or black spots serving as an image representing a circular and black figure formed on the document sheet. How large the neighboring areas is predetermined and is specified, for example, on the basis of the diameter of the punch hole.

On the basis of the result of the series of processing steps performed by the blank-sheet detection processing unit 24, the image output unit 26 excludes the image data regarding the document sheet determined as a blank document sheet from the output data and outputs the output data.

The recording medium/server 28 is a storage medium that stores data output by the image output unit 26 and an apparatus that receives data output by the image output unit 26. If the image output unit 26 is configured to output image data to the outside of the image processing system 10, the recording medium/server 28 does not have to be provided.

Figure 3:
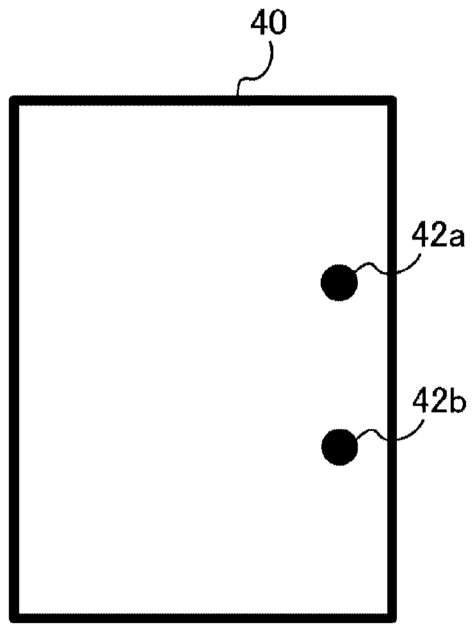
FIG. 3 is a view illustrating an example of a blank document sheet having holes opened with a two-hole punch.

The overview of the blank-sheet detection process executed by the image processing system 10 will then be described with reference to FIGS. 3 to 10. FIG. 3 is a view illustrating an example of a blank document sheet having holes opened with the two-hole punch. FIGS. 4 to 10 are each a view illustrating example image data for explaining the overview of the blank-sheet detection process.

FIG. 3 illustrates a document sheet 40. The document sheet 40 has holes 42*a* and 42*b* opened with the two-hole punch. The document sheet 40 has neither text nor figure in the portion except the holes 42*a* and 42*b* and thus is a document sheet naturally wished to be detected as a blank document sheet. For the exemplary embodiment, the blank-sheet detection will hereinafter be described by using, as an example, a blank document sheet that is a document sheet having holes opened with a punch, as illustrated in FIG. 3.

Figure 4:
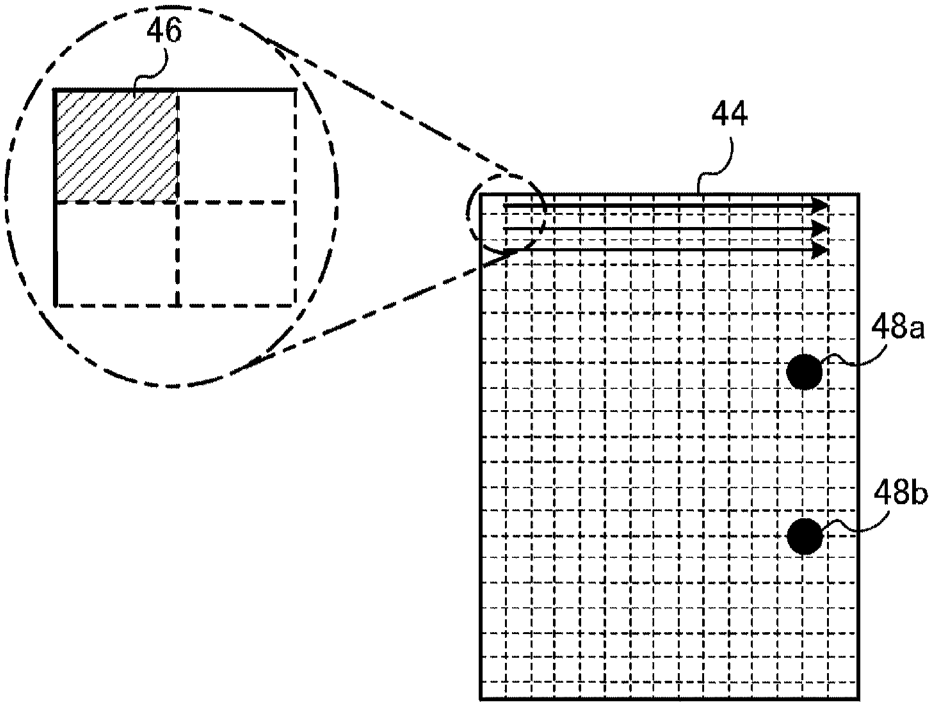
FIG. 4 is a view illustrating an example of image data for explaining the overview of a blank-sheet detection process.

FIG. 4 is a conceptual drawing illustrating image data 44 generated by reading the document sheet 40 illustrated in FIG. 3. The image data 44 is divided into areas of a predetermined size (for more details, areas indicated by the grid-like blocks as illustrated in such a manner as to be divided using broken lines in FIG. 4). In FIG. 4, the upper left portion in the image data 44 is surrounded by the alternate long and two short dashes line and is also enlarged. A hatched block 46 in the enlarged view is an example of an area of the predetermined size divided by the processor 18. Hereinafter, each divided area of the predetermined size is referred to as a predetermined area. In the exemplary embodiment, black spots are counted for each block represented by the block 46 in the series of processing steps implemented by the processor 18. The predetermined area is not limited to the area indicated by the grid-like block as described above. For example, the areas may partially overlap with each other. If processing speed is valued, areas located away from each other may serve as processing targets. In the exemplary embodiment, the size of the predetermined area is ½ of the radius of the circle as the largest hole of the holes opened in the document sheet but may be other than ½. The size that is ½ of the radius of the hole circle is a size set to prevent the occurrence of false detection in the system. For example, the hole has a shape other than the proper shape of holes opened with the two-hole punch on occasions. Even though the proper shape of the punch hole is, for example, a circle or a square, the hole is partially missing in shape and thus shaped like a crescent or the like in some cases. In such cases, the block having the highest count of black spots is not necessarily a block located in the center portion of the hole. At this time, depending on the set area sizes, although an area is actually part of the punch hole, the area is excluded in searching for an image representing a punch hole in the blank-sheet detection process. In the case where the punch hole has a circular shape, a block size leading to as much reduction as possible of such an excluded area is ½ of the radius of the circle as the punch hole. Hence, in the image processing system disclosed in this specification, the size of the predetermined area is set at ½ of the radius of the circle as the largest hole of the holes opened in the document sheet. In FIG. 4, circular and black images 48*a* and 48*b* on the image data 44 are respectively images representing the punch holes 42*a* and 42*b* (hereinafter, referred to as images representing punch holes 48*a* and 48*b*. The same expression is also used in FIGS. 5 to 10.).

As illustrated by the three rightward arrows in FIG. 4, the blank-sheet detection process in the exemplary embodiment is sequentially executed rightwards from the upper left block for each document sheet. Specifically, in the blank-sheet detection process in the exemplary embodiment, the following operation is repeated. Scanning is performed in such a manner as to: move rightward from the position of the leftmost top part set as the origin; complete the scanning at the right end; return to the left end; and move rightward from a position one to several pixels below the left end. That is, in the image processing system disclosed in this specification, a read area of the document sheet measures the maximum lengths of the document sheet in respective horizontal and vertical directions. Accordingly, in executing the blank-sheet detection process, the size of the document sheet read in advance does not have to be recognized in the image processing system 10, and thus it is only required to proceed with the process sequentially until the maximum lengths of the document sheet in the respective horizontal and vertical directions are reached. That is, the image processing system disclosed in this specification may implement the blank-sheet detection by executing the process sequentially until the maximum lengths of the document sheet in the respective horizontal and vertical directions are reached, regardless of whether the function of detecting the document size or the function of detecting the presence or the absence of a hole on the basis of the document size is provided.

Figure 5:
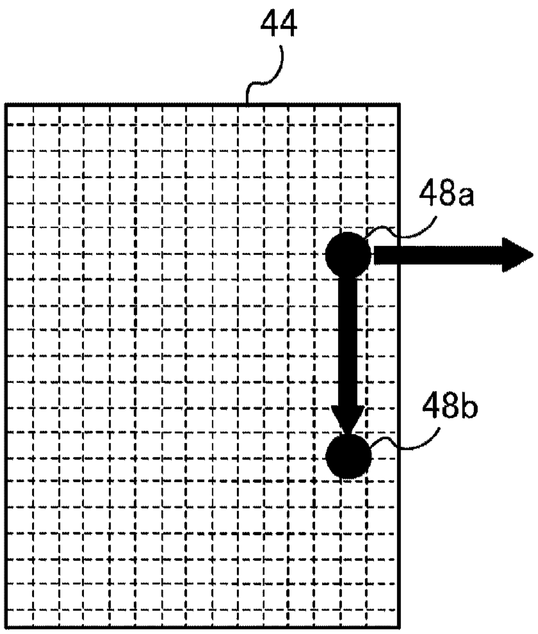
FIG. 5 is a view illustrating an example of image data for explaining the overview of the blank-sheet detection process.

FIG. 5 is a view for explaining an example where a block to serve as a candidate for an image representing a punch hole is found as the result of the blank-sheet detection processing unit 24 proceeding with the process above.

Figure 7:
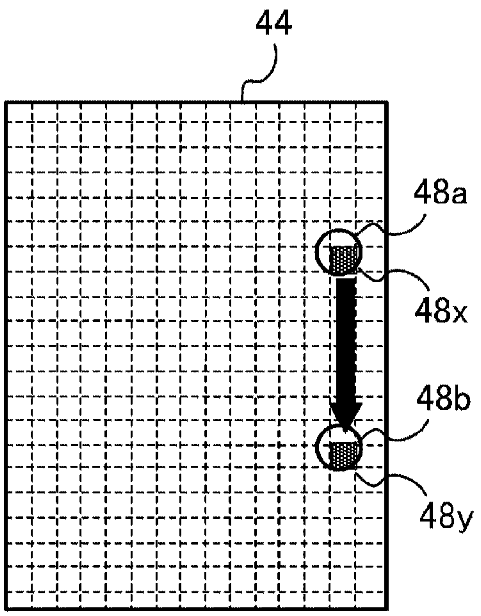
FIG. 7 is a view illustrating an example of image data for explaining the overview of the blank-sheet detection process.

If the count of black spots in a specific block (for example, a block 48*x* indicated by the dark gray portion in FIG. 7) is greater than or equal to a first threshold, the blank-sheet detection processing unit 24 counts black spots in a different block relevant to the specific block (for example, a block 48*y* indicated by the dark gray portion in FIG. 7). A different block is a block located at a position a predetermined length away from a specific block and located parallel or perpendicular to the scanning direction of the image data 44. For more details, in the exemplary embodiment, the different block is a block located at a position to be scanned later than a specific block located parallel or perpendicular to the scanning direction of the image data 44. This configuration leads to a lower processing accuracy than in a case where processing is performed in such a manner as to return to an already checked block (that is, scanned earlier than a different block) in terms of double check; however, in contrast, processing speed is improved as a whole. As mentioned above, in the blank-sheet detection process in the exemplary embodiment, the following operation is repeated. Scanning is performed in such a manner as to: move rightward from the position of the leftmost top part set as the origin; complete the scanning at the right end; return to the left end; and move rightward from a position one to several pixels below the left end. FIG. 5 represents rightward and downward thick arrows to indicate directions for searching for a different block. In the following description, a different block relevant to a specific block is likewise located to the right of or below the specific block in the exemplary embodiment. The predetermined length is set on the basis of a distance between two holes, for example, in the case of the two-hole punch. The distance may be set in accordance with the two-hole punch standard specified by Japanese Industrial Standard (JIS) but is not limited to this. In the case of another multi-hole punch, the predetermined length may be set on the basis of a distance between the holes opened with the multi-hole punch.

Subsequently, the blank-sheet detection processing unit 24 determines whether the count of the black spots in the different block relevant to the specific block is greater than or equal to the first threshold. If the count of the black spots in the different block is greater than or equal to the first threshold, the blank-sheet detection processing unit 24 further determines whether at least one of the count of the black spots in the specific block or the count of the black spots in the different block is greater than or equal to a second threshold. If the conditions above are all satisfied (that is, the count of the black spots in the specific block is greater than or equal to the first threshold, the count of the black spots in the different block is greater than or equal to the first threshold, and at least one of the count of the black spots in the specific block or the count of the black spots in the different block is greater than or equal to the second threshold), the blank-sheet detection processing unit 24 holds the coordinates of the specific block. The phrase "holding the coordinates of a block" denotes storing the coordinates as first coordinates, for example, in the memory 16. The blank-sheet detection processing unit 24 may store information regarding the different block (that is, information indicating that the different block is located to the right of or below the specific block and at the position the predetermined length away from the specific block) in the memory 16. The two thresholds that are the first threshold and the second threshold are provided to implement the blank-sheet detection with higher accuracy. First, the second threshold is a value greater than the first threshold. While the system is caused to recognize the specific block and the different block that are determined as having the count of black spots greater than or equal to the first threshold as punch hole candidates, the determination process is further executed with the second threshold that is the value greater than the first threshold. This causes improvement in accuracy in discriminating between an image representing a punch hole and an image simply having a black spot count greater than or equal to the threshold. In addition, for example, there is a case where part of one of punch hole portions in the document sheet is missing in shape. In this case, there is a possibility that the count of the black spots in the specific block as the part of one of the punch holes is less than the second threshold. However, determining that an image actually representing a punch hole is not an image representing a punch hole because the punch hole is simply missing in shape and thus the count of the black spots is determined to be short possibly leads to the occurrence of false detection in the blank-sheet detection process. Hence, the condition only requiring the count of black spots in at least one of the specific block or the different block to be greater than or equal to the second threshold is provided, and thereby the blank-sheet detection accuracy is improved.

Figure 6:
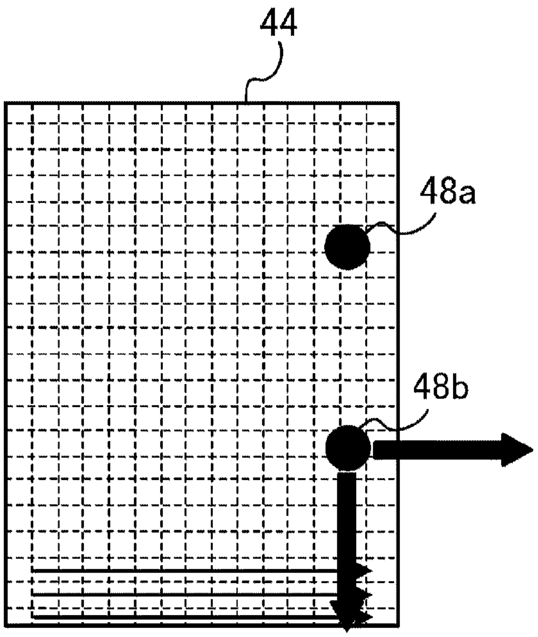
FIG. 6 is a view illustrating an example of image data for explaining the overview of the blank-sheet detection process.

Unlike FIG. 5, FIG. 6 is a view for explaining an example where the coordinates of a specific block are not held. If a block (such as the block 48$y$ that is part of the image 48$b$ and indicated by the dark gray portion in FIG. 7) serving as a candidate for an image representing a punch hole is found on the image data 44 as the result of the blank-sheet detection processing unit 24 proceeding with the process described above, the blank-sheet detection processing unit 24 searches for a different block relevant to the block 48$y$. However, as illustrated in FIG. 6, the position located to the right of or below a specific block and the predetermined length away from the specific block falls outside the image data 44, and thus no block is present at the position. In this case, the blank-sheet detection processing unit 24 terminates the process for the specific block and moves to the next block without holding the coordinates of the specific block.

A process subsequently executed after the counting of black spots per block on the image data 44 will then be described with reference to FIG. 7. As described with reference to FIG. 5, for the image data 44, the coordinates of a block 48$x$ as part of the image 48$a$ representing a punch hole are held. Information regarding the relevant block 48$y$ present at the position below the block 48$x$ and the predetermined length away from the block 48$x$ is held in the memory 16. In this case, the blank-sheet detection processing unit 24 calculates the sum total of the counts of black spots in each of the block 48$x$, the block 48$y$, and the blocks neighboring the block 48$x$ and the block 48$y$. The blank-sheet detection processing unit 24 determines whether a count derived by subtracting the sum total of the count of the black spots in the blocks 48$x$ and 48$y$ and the blocks neighboring the blocks 48$x$ and 48$y$ from the sum total of the count of black spots on the image data 44 is less than or equal to the specified value. If the derived count described above is less than or equal to the specified value, the blank-sheet detection processing unit 24 determines the document sheet 40 serving as the source of the image data 44 as a blank sheet.

Subsequently, in the exemplary embodiment, further different image processing may be performed on the basis of the result of the series of processing steps performed by the blank-sheet detection processing unit 24. A case where image data generated from a blank document sheet is discriminated from image data generated from a document sheet other than a blank document sheet in the process executed by the blank-sheet detection processing unit 24 and information regarding the process result is stored in the memory 16 is taken as an example. In this case, the image output unit 26 may output only the image data generated from the document sheet other than the blank document sheet in such a manner as to exclude only the image data generated from the blank document sheet from the image data on the basis of the information stored in the memory 16. In other words, the image output unit 26 may output image data other than the image data 44 regarding the document sheet 40 determined as a blank sheet in such a manner as to exclude the image data 44 from output data. The recording medium/server 28 then stores the image data output by the image output unit 26. The series of processing steps by the image processing system 10 enables a user to further perform image processing by using the image data generated from the document sheet other than the blank document sheet stored in the recording medium/server 28.

Figure 8:
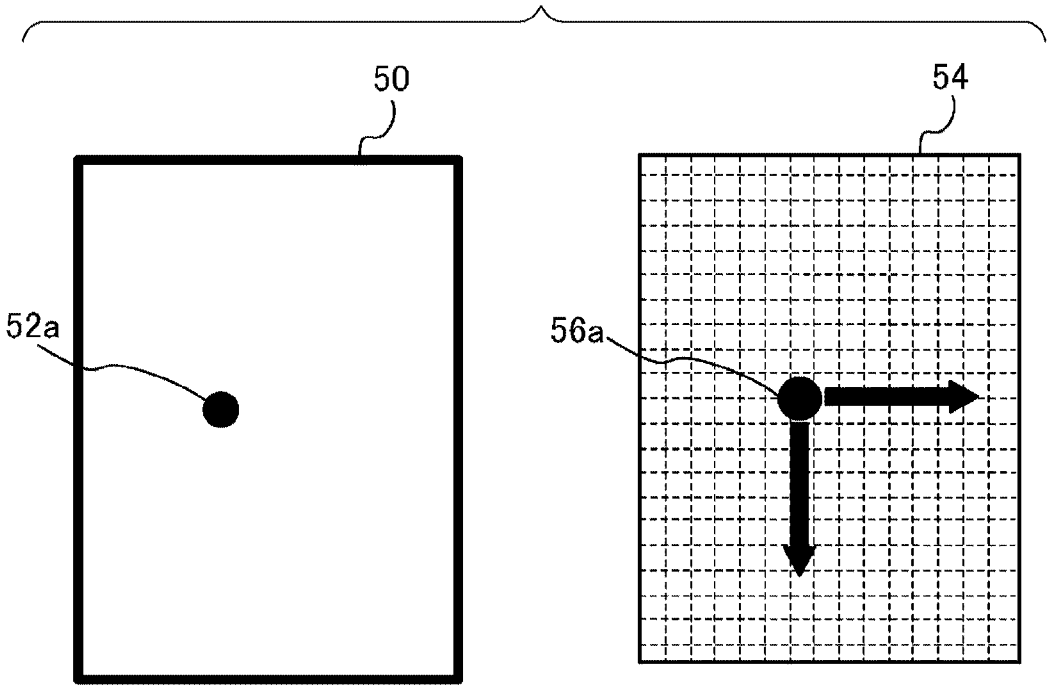
FIG. 8 is a view illustrating an example of image data for explaining the overview of the blank-sheet detection process.

Another example where the coordinates of a specific block are not stored will then be described with reference to FIG. 8. FIG. 8 is a conceptual drawing where a view illustrating a document sheet 50 and a circular and black figure 52$a$ displayed on the document sheet 50 and a view illustrating image data 54 generated by reading the document sheet 50 are displayed side by side. The image data 54 has an image 56$a$ representing the circular and black figure 52$a$. Assume that a series of processing steps performed by the blank-sheet detection processing unit 24 results in a determination that the count of black spots in a specific block as part of the image 56$a$ representing a circular and black figure is greater than or equal to the first threshold. In this case, the blank-sheet detection processing unit 24 subsequently searches for a different block relevant to the specific block. In FIG. 8, the rightward and downward thick arrows indicate search directions. However, as illustrated in FIG. 8, any black spot is not detected at the position located to the right of or below the specific block and the predetermined length away from the specific block. In this case, the blank-sheet detection processing unit 24 does not hold the coordinates of the specific block as part of the image 56$a$ representing the circular and black figure. This thus denotes that the blank-sheet detection processing unit 24 determines that the image 56$a$ representing the circular and black figure is not an image representing one of holes opened with the two-hole punch but part of the circular and black figure 52$a$ simply has black spots the count of which is greater than or equal to the first threshold. Accordingly, the image data 54 generated from the document sheet 50 is not detected as image data regarding a blank document sheet, and holding the coordinates serving as preprocessing of the detection is not performed, either.

Figure 9:
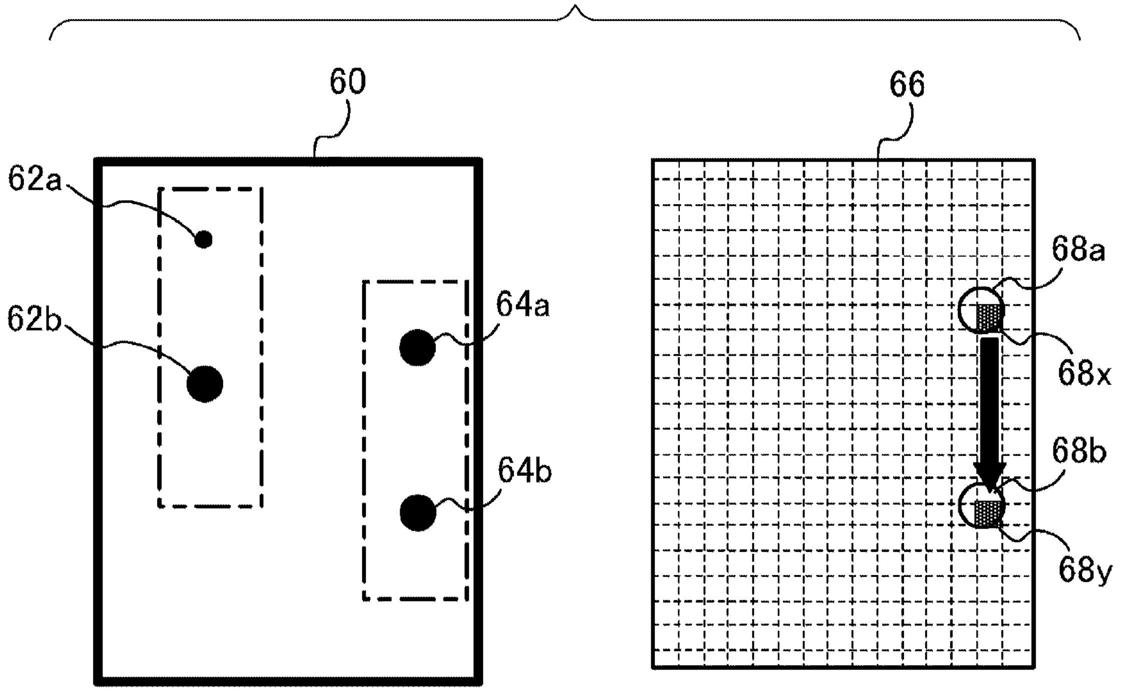
FIG. 9 is a view illustrating an example of image data for explaining the overview of the blank-sheet detection process.

FIG. 9 is a view for explaining a case where coordinates is re-held in the process for a piece of image data generated from a document sheet. More specifically, FIG. 9 is a conceptual drawing where a view illustrating a document sheet 60 and four figures 62$a$, 62$b$, 64$a$, and 64$b$ serving as candidates for holes opened with the two-hole punch and a view illustrating image data 66 generated by reading the document sheet 60 are displayed side by side. A case where a length between the figure 62$a$ and the figure 62$b$ and a length between the figure 64$a$ and the figure 64$b$ each match or substantially match a length between two punch holes opened with the two-hole punch is herein taken as an example. At this time, if the four figures are holes opened with the two-hole punch, it is surmised that the figures 62$a$ and 62$b$ are a pair and the figures 64$a$ and 64$b$ are a pair. In FIG. 9, each pair is thus displayed in such a manner that the corresponding figures are surrounded by the alternate long and two short dashes line. In such a case where candidates for multiple punch holes are present, the blank-sheet detection processing unit 24 extracts a specific block and a block relevant to the specific block that are combination with the highest total count of black spots (in other words, the pair with the highest total count of black spots in the image representing holes opened with the two-hole punch in one piece of image data 66 generated from the one document sheet 60). A case where the coordinates of a specific block in the one piece of image data 66 has been held is herein taken as an example. In this case, if the sum total of the count of black spots in a diverse block different from the specific block and the count of black spots in a still different block relevant to the diverse block is the highest, the blank-sheet detection processing unit 24 re-holds the coordinates of the diverse block. In the image data 66 in FIG. 9, the coordinates of the diverse block are denoted by 68*x* indicated by the dark gray portion, and the coordinates of the relevant still different block are denoted by 68*y* indicated by the dark gray portion. The document sheet 60 in FIG. 9 has multiple candidates for punch holes (that is, the pair of the figures 62*a* and 62*b* and the pair of the figures 64*a* and 64*b*), and the process by the blank-sheet detection processing unit 24 results in determination that the figures 64*a* and 64*b* are holes opened with the punch hole. In the image data 66 in FIG. 9, in consideration for clarity of the vision and to indicate that the figures 62*a* and 62*b* are not holes as the result of the process by the blank-sheet detection processing unit 24 (for more details, even though the figures 62*a* and 62*b* are holes, the figures 62*a* and 62*b* are not holes used for determination for the blank-sheet detection), the images representing the figures 62*a* and 62*b* are not illustrated. Accordingly, only images 68*a* and 68*b* representing the figures 64*a* and 64*b* are displayed in the image data 66 in FIG. 9. As described above, the combination with the highest total count of black spots in the document sheet are extracted, and thereby the blank-sheet detection is achieved with higher accuracy.

Figure 10:
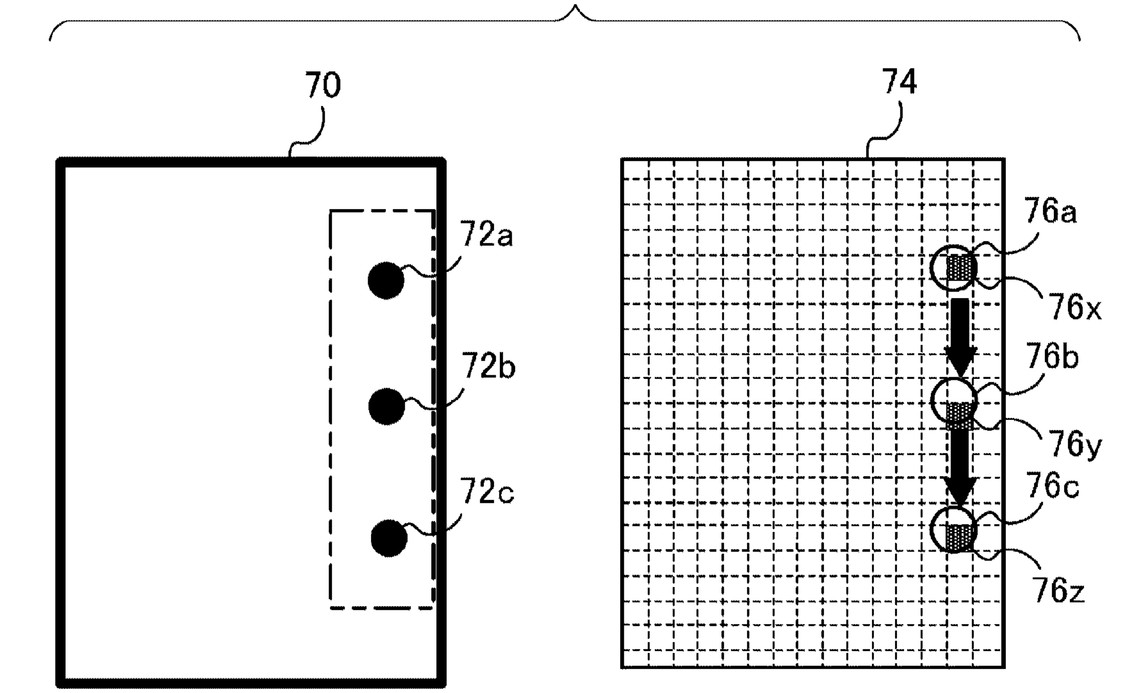
FIG. 10 is a view illustrating an example of image data for explaining the overview of the blank-sheet detection process.

FIG. 10 is a view for explaining blank-sheet detection performed in a case where holes are opened with a three-hole punch, not the two-hole punch. Specifically, FIG. 10 is a conceptual drawing where a view illustrating a document sheet 70 and holes 72*a*, 72*b*, and 72*c* opened with the three-hole punch and a view illustrating image data 74 generated by reading the document sheet 70 are displayed side by side. There are images 76*a*, 76*b*, and 76*c* respectively representing the punch holes 72*a*, 72*b*, and 72*c* on the image data 74. The blank-sheet detection process for a blank document sheet having holes opened with the three-hole punch is executed in the same manner as in the blank-sheet detection process described above with reference to FIGS. 3 to 9. Specifically, if a specific block having black spots the count of which is greater than or equal to the first threshold (in FIG. 10, for example, a block 76*x* indicated by the dark gray portion) is found, the blank-sheet detection processing unit 24 searches for a block relevant to the block 76*x*. At this time, in the process for finding punch holes opened with the three-hole punch, the count of relevant blocks is set in advance as two, and searching is performed for a block located to the right of or below the specific block 76*x* and a predetermined length away from the specific block 76*x*. In FIG. 10, the relevant block is a block 76*y* indicated by the dark gray portion. If the block 76*y* is found, the blank-sheet detection processing unit 24 then searches for a block located to the right of or below the block 76*y* and the predetermined length away from the block 76*y*. In FIG. 10, the block relevant to the block 76*y* is a block 76*z* indicated by the dark gray portion. The blank-sheet detection processing unit 24 subsequently determines whether the count of black spots in at least one of the blocks 76*x*, 76*y*, and 76*z* is greater than or equal to the second threshold. If the count of the black spots is greater than or equal to the second threshold, the blank-sheet detection processing unit 24 determines whether a count derived by subtracting the sum total of the count of the black spots in the blocks 76*x*, 76*y*, and 76*z* and blocks neighboring the blocks 76*x*, 76*y*, and 76*z* from the sum total of the count of black spots on the image data 74 is less than or equal to the specified value. If the derived count is less than or equal to the specified value, the blank-sheet detection processing unit 24 determines that the document sheet 70 serving as the source of the image data 74 is a blank sheet. As described above, the blank-sheet detection processing unit 24 applies the series of processing steps for the blank-sheet detection to punch holes opened with the multi-hole punch other than the two-hole punch.

Figure 11:
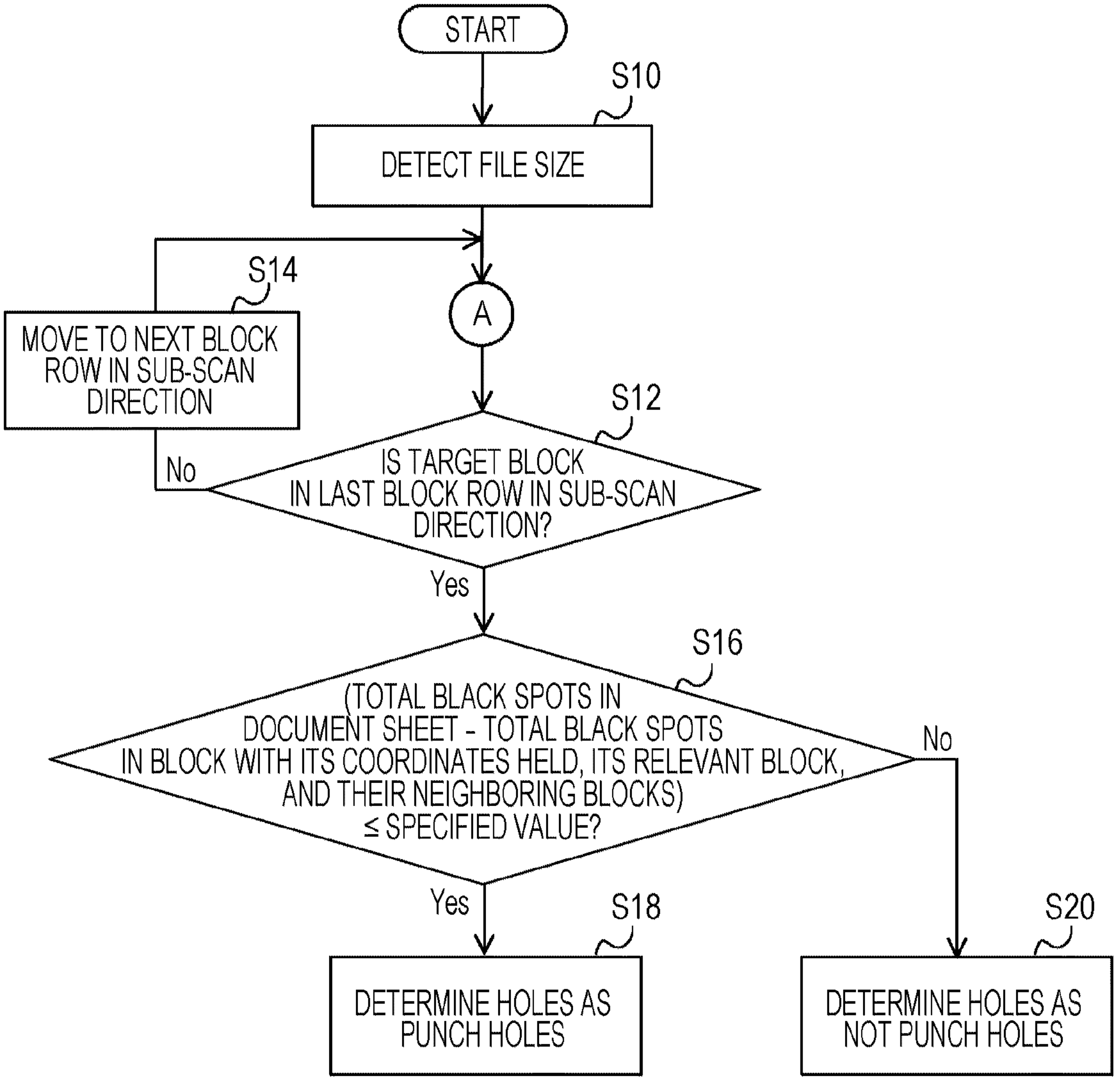
FIG. 11 is a flowchart illustrating the flow of a process by the image processing system according to the exemplary embodiment.

A process according to the exemplary embodiment will then further be described with reference to FIG. 11. FIG. 11 is a flowchart illustrating the flow of the process by the image processing system according to the exemplary embodiment. In the exemplary embodiment, as mentioned above, the processor 18 controls the operations of the components of the image processing system 10 and executes the blank-sheet detection process.

First, in response to the user issuing an instruction in the blank-sheet detection with the UI 12, the process is started. For example, the user places a document sheet on the document bed of a multi-function printer and pushes an instruction button for scanning each document sheet and a button such as a Blank-sheet detection ON button. In response to receiving the instruction, the processor 18 performs a series of processing steps of detecting and reading one or more document sheets and generating image data from each read document sheet. The processor 18 then detects a file size in image data generated by reading the received document sheet (S10). At this step, the process for determining whether the document sheet is a blank sheet is required except in cases where the document sheet is clearly determined as a blank document sheet on the basis of the file size. The processor 18 thus proceeds with the blank-sheet detection process. Specifically, the processor 18 moves the processing to A in FIG. 11.

Figure 12:
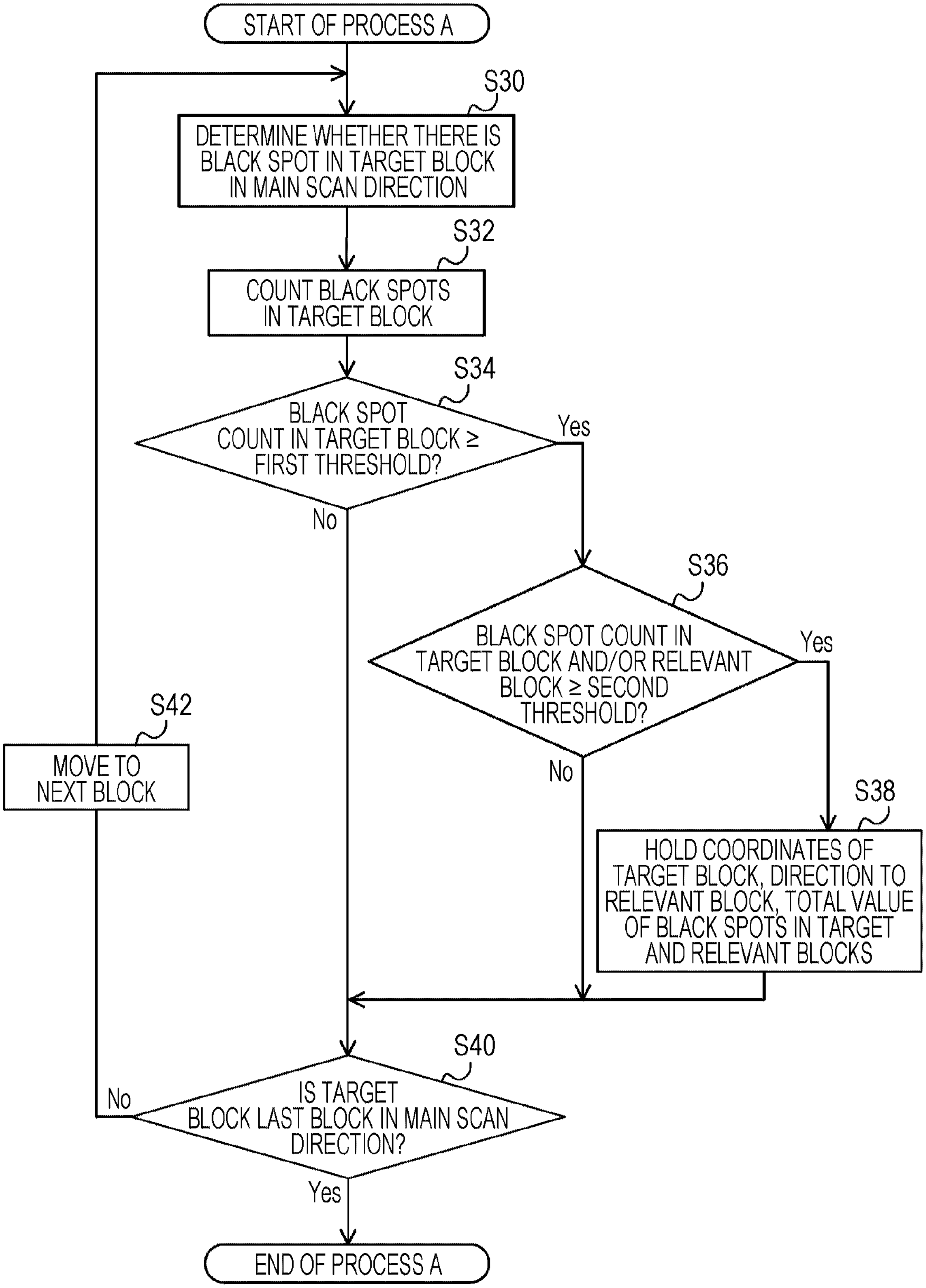
FIG. 12 is a flowchart of a process A illustrated in FIG. 11.

Subsequently, the content of the portion corresponding to a process A illustrated in FIG. 11 will be described with reference to FIG. 12. FIG. 12 is a flowchart of the process A illustrated in FIG. 11. The processor 18 proceeds with processing in a main-scan direction and performs determination of black spots in a target block (S30). The target block is a processing target block of the divided blocks of the predetermined size in the image data generated in step S10. In the image data 44 illustrated in FIG. 4 taken as an example, the target block immediately after the process A is started is the block 46 in the upper left part thereof. The main-scan direction is a rightward direction in which the blank-sheet detection process is sequentially executed as indicated by the arrows in the three rightward arrows in FIG. 4 and is synonymous with the horizontal direction or a row direction in the exemplary embodiment. The processor 18 determines whether the target block includes black spots that are pixels with density greater than or equal to the specified density (S30) and counts the black spots in the target block (S32).

Subsequently, the processor 18 determines whether the count of the black spots in the target block is greater than or equal to the first threshold (S34). If the count of the black spots in the target block is greater than or equal to the first threshold (Yes in S34), the processor 18 determines whether at least one of the count of the black spots in the target block or the count of black spots in the different block relevant to the target block is greater than or equal to the second threshold (S36). As mentioned above, a different block relevant to a target block is a block located at a position a predetermined length away from the target block and to the right of or below the target block. The description is continued for this flowchart on the assumption that the count of the black spots in the different block is greater than or equal to the first threshold. If it is determined that the count of the black spots is greater than or equal to the second threshold in step S36 (Yes in S36), the processor 18 holds the coordinates of the target block, the direction to the different block relevant to the target block, and the sum total of the counts of black spots in these blocks and neighboring blocks (S38). In contrast, if the determination in step S34 results in No, or if the determination in step S36 results in No, the process moves to step S40.

Subsequently, the processor 18 determines whether the target block is the last block in the main-scan direction (S40). If the target block is not the last block (No in S40), the processor 18 moves the processing target to the next block (S42). Thereafter, the processor 18 performs steps S30 to S40 again. In contrast, if the target block is the last block (Yes in S40), the processor 18 terminates the process A and moves the processing to step S12 illustrated in FIG. 11.

The processor 18 then determines whether the target block is in the last block row in a sub-scan direction (S12). As mentioned above, the main-scan direction is synonymous with the horizontal direction or the row direction, while the sub-scan direction is synonymous with the vertical direction or a column direction. If the target block is not in the last block row (No in S12), the processor 18 moves the processing target to the next block row in the sub-scan direction (S14). In other words, the next target block is a block in the leftmost column and in the next row. The processor 18 executes the process A and step S12 again. In contrast, if the target block is in the last block row in the sub-scan direction (Yes in S12), the processing moves to step S16. In other words, this is performed in a case where the processing is performed sequentially until the processing length reaches the maximum lengths of the document sheet in the respective horizontal and vertical directions and the processing for the last block on the document sheet is terminated. In this case, subsequent to the processing steps above, the processor 18 subtracts, from the sum total of the black spots on the document sheet, the sum total of the count of black spots in the block the coordinates of which are held, the block relevant to the block, and neighboring blocks thereto and determines whether the derived count is less than or equal to the specified value (S16). If it is determined that the derived count is less than or equal to the specified value in step S16 (Yes in S16), the processor 18 determines that the target block and the block relevant thereto are punch holes (S18). That is, it is determined that image data having a target block the coordinates of which are held is image data generated from a document sheet composed of only a blank document sheet+punch holes. In contrast, if it is determined that the derived count is not less than and not equal to the specified value (No in S16), the processor 18 determines that the target block and the block relevant thereto are not punch holes (S20). That is, the document sheet that is the source of the image data having the target block the coordinates of which are held is not a blank document sheet. The series of processing steps described above enables the processor 18 to determine whether the document sheet is a blank sheet on the basis of whether an image portion representing holes satisfies the predetermined conditions, without performing recognition uniformly. The processor 18 does not perform recognition that the read document sheet has circular and black figures or the like even though the document sheet has punch holes. If there are multiple document sheets in the series of processing steps related to the blank-sheet detection mentioned above, the series of processing steps may be performed after all the document sheets are read. Alternatively, the document sheets may be read one by one, and the series of processing steps may be performed on one piece of image data generated from the one document sheet every time the document sheet is read.

In the image processing system 10, inclination of a document sheet is detected on occasions when the document sheet is read. In a case of so-called skew of the document sheet, increasing the size of the predetermined area (that is, each divided block in the exemplary embodiment) enables punch holes to be detected even in image data generated from such a skewed document sheet and thereby the blank-sheet detection process to be implemented.

The functions of the image processing system 10 are implemented in cooperation between, for example, hardware and software. For example, the processor reads out a program stored in the memory of each of devices and runs the program, and thereby the functions of the devices are implemented. The program is stored in the memory via a recording medium such as a compact disk (CD) or a digital versatile disk (DVD) or a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing system includes:

a processor configured to:

- determine, for each of predetermined areas, whether a black spot corresponding to a pixel with density greater than or equal to specified density is included in image data generated by reading a received document sheet;
- make a count of the black spot for each predetermined area;
- recognize, as a specific area, an area that is one of the predetermined areas and that includes a black spot a count of which is greater than or equal to a first threshold;
- recognize, as a different area relevant to the specific area, an area that is located at a position a predetermined length away from the specific area and that is located parallel or perpendicular to a scanning direction of the image data, the area including a black spot a count of which is greater than or equal to the first threshold;

calculate a sum total of the count of the black spot for the document sheet and determine whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detect, as image data regarding a blank document sheet, image data regarding a document sheet with the derived count less than or equal to the specified value.

(((2)))

In the image processing system according to (((1))), the processor is configured to:

in response to at least one of the count of the black spot in the specific area or the count of the black spot in the different area being greater than or equal to a second threshold, hold a coordinate of the specific area as a first coordinate; and in response to the derived count being less than or equal to the specified value, detect, as the image data regarding the blank document sheet, image data for which the first coordinate is held.

(((3)))

In the image processing system according to (((2))), the processor is configured to:

in the image data for which the first coordinate is held, recognize, as a diverse area, an area that is different from the specific area and that includes a black spot a count of which is greater than or equal to the first threshold;

recognize, as a still different area relevant to the diverse area, an area that is located at a position a predetermined length away from the diverse area and that is located parallel or perpendicular to the scanning direction of the image data, the area including a black spot a count of which is greater than or equal to the first threshold; and in response to at least one of the count of the black spot in the diverse area or the count of the black spot in the still different area being greater than or equal to the second threshold, and in response to a sum total of the count of the black spot in the diverse area and the count of the black spot in the still different area being greater than a sum total of the count of the black spot in the specific area and the count of the black spot in the diverse area, re-hold a coordinate of the diverse area as the first coordinate.

(((4)))

In the image processing system according to (((1))), a size of the predetermined area is ½ of a radius of a circle as a largest hole of a hole opened in the document sheet.

(((5)))

In the image processing system according to (((1))), the different area includes one or more different areas and is located at a position scanned after the specific area is scanned.

(((6)))

In the image processing system according to (((3))), the still different area includes one or more still different areas and is located at a position scanned after the diverse area is scanned.

(((7)))

A program causes a computer to execute a process including:

determining, for each of predetermined areas, whether a black spot corresponding to a pixel with density greater than or equal to specified density is included in image data generated by reading a received document sheet;

making a count of the black spot for each predetermined area;

recognizing, as a specific area, an area that is one of the predetermined areas and that includes a black spot a count of which is greater than or equal to a first threshold;

recognizing, as a different area relevant to the specific area, an area that is located at a position a predetermined length away from the specific area and that is located parallel or perpendicular to a scanning direction of the image data, the area including a black spot a count of which is greater than or equal to the first threshold;

calculating a sum total of the count of the black spot for the document sheet and determining whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detecting, as image data regarding a blank document sheet, image data regarding a document sheet with the derived count less than or equal to the specified value.

What is claimed is:

1. An image processing system comprising:

a processor configured to:

determine, for each of predetermined areas, whether a black spot corresponding to a pixel with density greater than or equal to specified density is included in image data generated by reading a received document sheet;

make a count of the black spot for each predetermined area;

recognize, as a specific area, an area that is one of the predetermined areas and that includes a black spot a count of which is greater than or equal to a first threshold;

recognize, as a different area relevant to the specific area, an area that is located at a position a predetermined length away from the specific area and that is located parallel or perpendicular to a scanning direction of the image data, the area including a black spot a count of which is greater than or equal to the first threshold;

calculate a sum total of the count of the black spot for the document sheet and determine whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detect, as image data regarding a blank document sheet, image data regarding a document sheet with the derived count less than or equal to the specified value.

2. The image processing system according to claim 1, wherein the processor is configured to:

in response to at least one of the count of the black spot in the specific area or the count of the black spot in the different area being greater than or equal to a second threshold, hold a coordinate of the specific area as a first coordinate; and in response to the derived count being less than or equal to the specified value, detect, as the image data regarding the blank document sheet, image data for which the first coordinate is held.

3. The image processing system according to claim 2, wherein the processor is configured to:

in the image data for which the first coordinate is held, recognize, as a diverse area, an area that is different from the specific area and that includes a black spot a count of which is greater than or equal to the first threshold;

recognize, as a still different area relevant to the diverse area, an area that is located at a position a predetermined length away from the diverse area and that is located parallel or perpendicular to the scanning direction of the image data, the area including a black spot a count of which is greater than or equal to the first threshold; and in response to at least one of the count of the black spot in the diverse area or the count of the black spot in the still different area being greater than or equal to the second threshold, and in response to a sum total of the count of the black spot in the diverse area and the count of the black spot in the still different area being greater than a sum total of the count of the black spot in the specific area and the count of the black spot in the diverse area, re-hold a coordinate of the diverse area as the first coordinate.

4. The image processing system according to claim 1, wherein a size of the predetermined area is ½ of a radius of a circle as a largest hole of a hole opened in the document sheet.

5. The image processing system according to claim 1, wherein the different area includes one or more different areas and is located at a position scanned after the specific area is scanned.

6. The image processing system according to claim 3, wherein the still different area includes one or more still different areas and is located at a position scanned after the diverse area is scanned.

7. A non-transitory computer readable medium storing a program causing a computer to execute a process comprising:

determining, for each of predetermined areas, whether a black spot corresponding to a pixel with density greater than or equal to specified density is included in image data generated by reading a received document sheet;

making a count of the black spot for each predetermined area;

recognizing, as a specific area, an area that is one of the predetermined areas and that includes a black spot a count of which is greater than or equal to a first threshold;

recognizing, as a different area relevant to the specific area, an area that is located at a position a predetermined length away from the specific area and that is located parallel or perpendicular to a scanning direction of the image data, the area including a black spot a count of which is greater than or equal to the first threshold;

calculating a sum total of the count of the black spot for the document sheet and determining whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detecting, as image data regarding a blank document sheet, image data regarding a document sheet with the derived count less than or equal to the specified value.

8. An image processing method comprising:

determining, for each of predetermined areas, whether a black spot corresponding to a pixel with density greater than or equal to specified density is included in image data generated by reading a received document sheet;

making a count of the black spot for each predetermined area;

recognizing, as a specific area, an area that is one of the predetermined areas and that includes a black spot a count of which is greater than or equal to a first threshold;

recognizing, as a different area relevant to the specific area, an area that is located at a position a predetermined length away from the specific area and that is located parallel or perpendicular to a scanning direction of the image data, the area including a black spot a count of which is greater than or equal to the first threshold;

calculating a sum total of the count of the black spot for the document sheet and determining whether a derived count derived from subtraction from the sum total is less than or equal to a specified value, the subtraction being performed by subtracting, from the sum total, a sum total of the count of the black spot in the specific area, the count of the black spot in the different area, and a count of black spots in respective areas neighboring the specific area and the different area; and detecting, as image data regarding a blank document sheet, image data regarding a document sheet with the derived count less than or equal to the specified value.

* * * * *